US012711314B2

(12) United States Patent
Agarwal et al.

(10) Patent No.: US 12,711,314 B2
(45) Date of Patent: Aug. 18, 2026

(54) INTELLIGENT VIRTUAL ASSISTANT FOR COMMUNICATION MANAGEMENT AND AUTOMATED RESPONSE GENERATION

(71) Applicant: Celligence International LLC, Guaynabo, PR (US)

(72) Inventors: Pavan Agarwal, Dorado, PR (US); Gabriel Albors Sanchez, San Juan, PR (US); Jonathan Ortiz Rivera, San Juan, PR (US); Jennifer Vallinayagam, Guaynabo, PR (US)

(73) Assignee: Celligence International LLC, Guaynabo, PR (US)

( * ) Notice: Subject to any disclaimer, the term of this patent is extended or adjusted under 35 U.S.C. 154(b) by 114 days.

(21) Appl. No.: 18/741,747

(22) Filed: Jun. 12, 2024

(65) Prior Publication Data

US 2024/0412001 A1 Dec. 12, 2024

Related U.S. Application Data

(60) Provisional application No. 63/472,516, filed on Jun. 12, 2023.

(51) Int. Cl.
*G06F 40/35* (2020.01)
*G06F 40/253* (2020.01)
*G06F 40/30* (2020.01)

(52) U.S. Cl.
CPC ............ *G06F 40/35* (2020.01); *G06F 40/253* (2020.01)

(58) Field of Classification Search
CPC ......... G06F 40/35; G06F 40/253; G06F 40/30
USPC ................. 704/8–9, 231–232, 239, 246, 251
See application file for complete search history.

(56) References Cited

U.S. PATENT DOCUMENTS

2023/0125580 A1* 4/2023 Tunstall-Pedoe ... G06F 16/3329 704/9
2023/0153539 A1* 5/2023 Uhl ...................... G06N 3/0895 705/2

OTHER PUBLICATIONS

PCT International Search Report and the Written Opinion mailed Sep. 16, 2024, issued in related International Application No. PCT/US2024/033689 (8 pages).

* cited by examiner

*Primary Examiner* — George C Monikang
(74) *Attorney, Agent, or Firm* — Sheppard Mullin Richter & Hampton LLP

(57) ABSTRACT

Systems and methods are provided for facilitating inviting a conversation administrator to a message exchange (i.e., a text conversation) between chat participants. The conversation administrator is configured to use natural language processing and machine learning algorithms to provide support to human chat participants by assisting with various tasks or inquiries, resolving disputes, and acting in a mediator or counselor capacity.

18 Claims, 9 Drawing Sheets

INTELLIGENT VIRTUAL ASSISTANT FOR COMMUNICATION MANAGEMENT AND AUTOMATED RESPONSE GENERATION

RELATED APPLICATIONS

This application claims the benefit of U.S. Provisional Application No. 63/472,516 filed on Jun. 12, 2023, the contents of which are incorporated herein by reference in its entirety.

TECHNICAL FIELD

The present disclosure is generally related a computer program that utilizes artificial intelligence and natural language processing to moderate a group conversation between participants within a messaging platform or application. More particularly, the present disclosure is directed to systems and methods for enabling computer programs to effectively assist group conversation participants by executing tasks that would normally require human intelligence.

BACKGROUND

A virtual assistant ("VA") is a computer program that utilizes artificial intelligence and natural language processing to provide assistance to users via a chat interface. The virtual assistant can understand user queries and respond with appropriate information or actions. Virtual assistants can be designed to perform a variety of tasks, such as answering frequently asked questions, providing recommendations, scheduling appointments, ordering food, booking travel arrangements, and more. They can also be integrated with other software and services, such as calendars, email, and social media. To interact with a virtual assistant, users typically type their queries or commands into a chat window. The virtual assistant then processes the input and responds with relevant information or takes the requested action. In some cases, virtual assistants can also interpret voice commands or utilize voice-to-text technology to provide a more natural user experience.

Virtual assistants are increasingly being used in a variety of contexts, including customer service, healthcare, education, and finance. While VAs can be integrated into websites, mobile applications, and messaging platforms to provide users with quick and convenient access to information and services, they often provide assistance within a platform or application associated with a specific industry, such as customer service for an e-commerce site. Accordingly, there is an ongoing need for users of non-industry specific chat platforms or applications to receive conversation moderation and other assistance from a virtual assistant that can be invited to their conversation.

SUMMARY

In accordance with one or more embodiments, various features and functionality can be provided to enable or otherwise facilitate inviting a conversation administrator to a message exchange (i.e., a text conversation) between chat participants. The conversation administrator may be invited by any of the conversation participants at any point in the course of the chat and may have the "look and feel" of just another (human) participant. The conversation administrator is configured to use natural language processing and machine learning algorithms to provide support to human chat participants by: (i) assisting with various tasks or inquiries that participants may request the conversation administrator directly (e.g., asking for a game score, using expert knowledge to generate responses) or inferred by the conversation administrator directly from the conversation (e.g., checking on available flights when friends are discussing an upcoming trip) using various analytics and modeling techniques, (ii) resolving disputes between chat participants (e.g., by providing details from earlier in the conversation to help resolve an argument, factual support from a knowledge base, providing emotional guidance and employing other techniques used often by humans), and (iii) acting in a mediator or counselor capacity (e.g., by using expert techniques in furthering conflict resolution, assisting participants with deciphering emotional cues and tonality, maintaining order and other such similar methods) to all participants (i.e., standard mode) or on an individual basis (i.e., adversarial mode).

In some embodiments, the conversation administrator may be generated by a conversation administrator application provided by a conversation administrator server configured to interface with client computing devices and external servers. In some embodiments, the conversation administrator system and process may include obtaining a command for initiating conversation administrator. For example, the command may originate from a computing device operated by a user and may comprise a specific phrase, such as "Angel, join" or "Hey, Angel" or "Angel" or simply asking a question or request "Angel, what is the score of the Padres game?" The initiation command may comprise a textual command, a voice command, or an input entered by any other means.

Once the process for initiating the conversation administrator to join the group is completed, the conversation administrator may interact with users, analyze the group chat for relevant information, and provide responses based on the analyzed information. In some embodiments, the conversation administrator system and process may update the group chat with information. For example, the messages from conversation administrator may include responses to questions from participants. Alternatively, the conversation administrator system and process may update external services in accordance with analyzed conversation. For instance, the conversation administrator may updated users' calendars with the upcoming meeting information.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
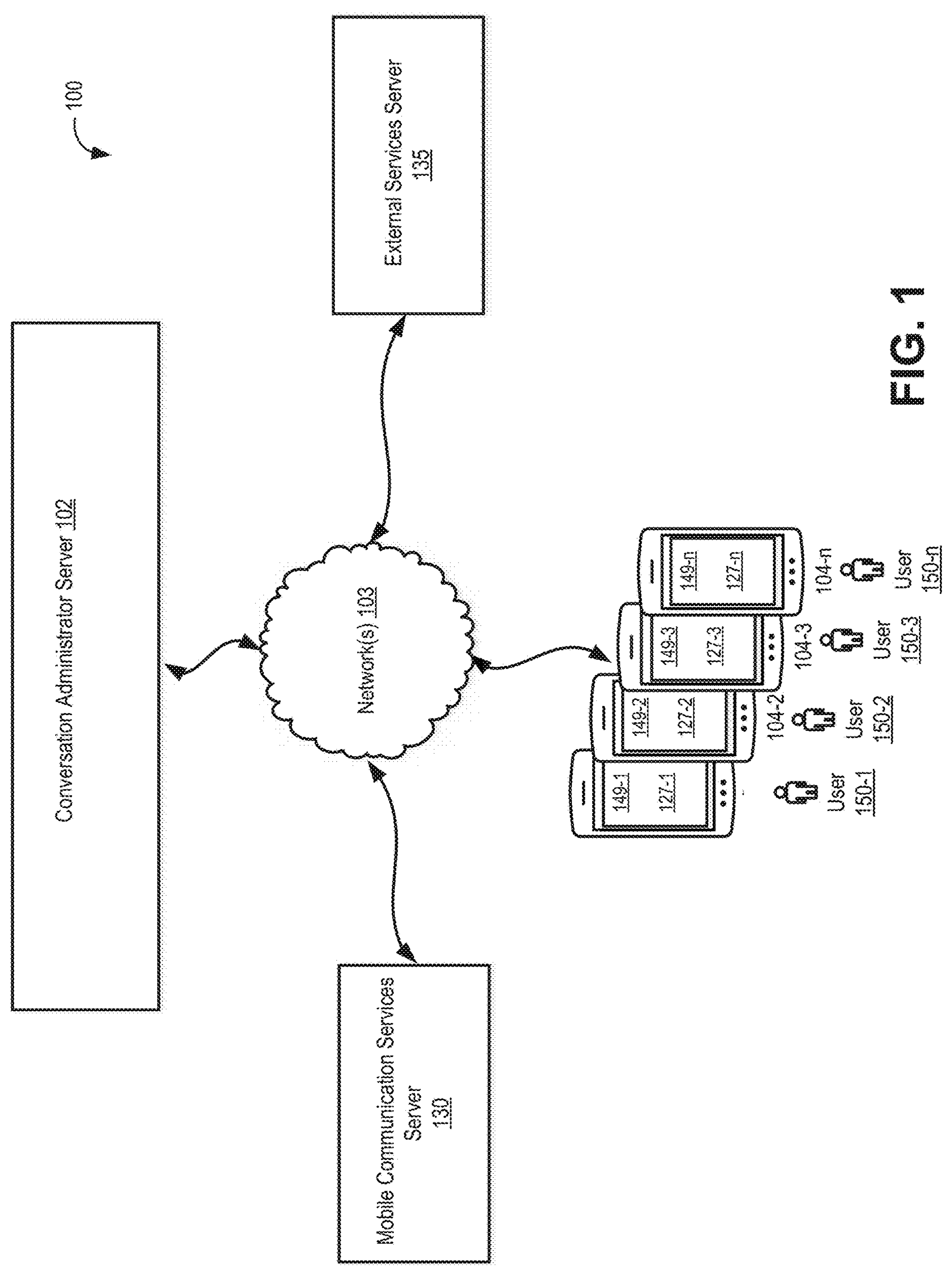
FIG. 1 illustrates example system an example overview of a conversation administrator system, according to an implementation of the disclosure.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As alluded to above, a virtual assistant program ("VA") that utilizes artificial intelligence and natural language processing to provide assistance to users via a chat interface accessed individually. That is, the VA is generally designed to assist one user at a time. Moreover, VA is only available to support individual user's needs, often in a limited, industry-specific setting (i.e., banking application). Notably, accessing a VA requires users to utilize a chat interface. Indeed, exchanging text messages via a chat interface of an online messaging application has become an essential communication tool in today's digital age, providing a convenient and efficient way for people to stay connected with each other. As discussed above, because VAs commonly "assists" individual users during a conversation or chat only, a traditional VA is unable to provide assistance to a plurality of users joined in a conversation (e.g., users in a messenger channel).

Described herein are systems and methods for a conversation administrator system that can manage interactions with multiple users concurrently. As discussed above, existing systems are often limited to single-user interactions, leading to inefficiencies in multi-user scenarios. The conversation administrator addresses these limitation by providing a robust framework for handling multiple user interactions. The system includes components for user recognition, context management, natural language understanding (NLU), response generation, and multi-modal input/output processing. This enables the conversation administrator to deliver tailored assistance to participants in accordance to selected operation mode. For example, assistance can be delivered to all participants (e.g., standard or moderator mode) or each user based on their specific needs and context (e.g. adversarial mode).

The following embodiments provide technical solutions or technical improvements that overcome technical problems, drawbacks or deficiencies in the technical fields involving, consolidation, standardization, and review of data from disparate data sources, automatic identification of users' emotional state and generating a response in the context of the determined emotional state in a robust, accurate and efficient manner to improve the performance and accuracy of the assistance provided by a VA application, among others. The emotional state may be identified using a composite model comprising one or more semantic models to generate an assessment of the emotional state. In some embodiments, this process leverages machine learning, natural language processing (NLP), and other AI techniques to interpret and evaluate various forms of data related to a users' behavior, expressions, and interactions. In some embodiments, the behavior may include keystroke rate, (e.g., how fast the user is typing), time between keystrokes (e.g., where the user chooses to pause when typing).

In some embodiments, the conversation system may be integrated with existing mobile messaging applications (e.g., WhatsApp, Telegram, Facebook Messenger, and so on), communication applications, including email, as well as external platforms web-based platforms. By allowing the presently disclosed VA to seamlessly integrate with existing messaging or communication platforms allows the VA not only to assist a greater number of participants, it also removes the need for running any superfluous instances of VA software thereby optimizing systems resources. Furthermore, when VA is invited into a group conversation, it can perform a variety of tasks that are simply not possible in a single user setting. For instance, VA conversation administrator may respond to user questions and comments, provide support and guidance as needed, resolve disputes between participants, act in a mediator or counselor capacity, as will be described in more detailed herein.

In some embodiments, the conversation administrator system may be integrated with an a web-based platform to facilitate real-time chat-based assistance between a human user and an expert human assistant. The system manages the interaction by routing queries, providing preliminary information, and learning from the exchanges to improve future assistance by applying machine learning techniques according to certain example embodiments described herein. This system enhances the efficiency of obtaining expert advice while reducing the workload on human assistants.

In some embodiments, the conversation system may be integrated with email applications, including but not limited to Google Gmail, Apple Mail, Microsoft Outlook, among other email programs and services. For example, the user may choose to carbon-copy (CC) an email address monitored by the conversation system as a recipient of all incoming and outgoing emails addressed to the user. By analyzing the corpus of user's correspondence, the system learns from the user's email interactions to identify response patterns and priorities. This enables the system to generate and send automated responses tailored to the user's communication style and preferences, thereby improving email efficiency and reducing the user's workload. The system may generate contextually appropriate responses, which can be sent automatically or presented to the user for approval. The system aims to reduce the user's email management burden and enhance productivity.

In some embodiments, the conversation system may provide an automated customer service email solution that reviews incoming emails, analyzes the content, urgency, and emotional sentiment, and determines the best course of action. For example, the system may generate automated responses, provide drafts for CSR review, or route emails to CSRs based on priority. Customer service departments often face high volumes of email inquiries, which can lead to delays in response times and inconsistent service quality. Traditional email management systems lack the sophistication to analyze the content and emotional tone of emails effectively. There is a need for an advanced solution that can prioritize emails, generate appropriate responses, and route them to human representatives when necessary, thereby improving efficiency and customer satisfaction. This system reduces the workload on customer service teams and ensures timely and appropriate responses to customer inquiries.

Moreover, various practical applications of the disclosed technology are also described, which provide further practical benefits to users and operators that are also new and useful improvements in the art.

FIG. 1 illustrates an example conversation administrator system 100 for providing a for manage interactions with multiple users concurrently, in accordance with the embodiments disclosed herein. In some embodiments, system 100 may include a conversation administrator server 102 in communication with one or more network(s) 103.

interacting with users that are utilizing a messaging application The system 100 may also include one or more mobile communication services server 130, one or more external services server 135, and a plurality of client computing devices 104-1 . . . -n, that are in communication with network 103. A plurality of users 150-1 . . . -n may be associated with a plurality of client computing devices 104-1 . . . -n, respectively, as described in detail below.

The terms "conversation administrator," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a conversation administrator is capable of accepting a user request at least partially in the form of a natural language command, request, statement, narrative, and/or inquiry. Typically, the user request seeks either an informational answer or performance of a task by the conversation administrator. A satisfactory response to the user request includes a provision of the requested informational answer, a performance of the requested task, or a combination of the two. For example, a user asks the conversation administrator a question, such as "Where am I right now?" Based on the user's current location, the conversation administrator answers, "You are in Central Park near the west gate." The user also requests the performance of a task, for example, "Please invite my friends to my girlfriend's birthday party next week." In response, the conversation administrator can acknowledge the request by saying "Yes, right away," and then send a suitable calendar invite on behalf of the user to each of the user's friends listed in the user's electronic address book. During performance of a requested task, the conversation administrator sometimes interacts with the user in a continuous dialogue involving multiple exchanges of information over an extended period of time. There are numerous other ways of interacting with a conversation administrator to request information or performance of various tasks. In addition to providing verbal responses and taking programmed actions, the conversation administrator also provides responses in other visual or audio forms, e.g., as text, alerts, music, videos, animations, etc.

In some embodiments, conversation administrator running on client computing devices 104-1 . . . -n may be implemented according to a client-server model by conversation administrator server 102, including a client-side component (hereafter, conversation administrator application 127 or a plurality of conversation administrator applications 127-1 . . . -n) executed on the plurality of client computing devices 104-1 . . . -n, and a server-side component (illustrated in FIG. 2) executed on conversation administrator server 102. The client provides client-side functionalities such as user-facing input and output processing and communication with conversation administrator server 102. The conversation administrator server-side part provides server-side functionalities for any number of conversation administrator applications 127-1 . . . -n initiated on respective user devices 104-1 . . . -n.

As allude to earlier, the conversation administrator may be integrated into a chat application, which is a client-side component (hereafter, mobile messaging application 130 or a plurality of mobile messaging applications 149-1 . . . -n) provided by the mobile communication services server 130 and executed on the plurality of client computing devices 104-1 . . . -n. Users may use messaging applications 149-1 . . . -n when engaging a chat conversation. Examples of messaging application may include WhatsApp®, Viber®, or similar applications, or messengers provided by social media platforms such as Facebook®, Instagram®, LinkedIn®, as well as messenger clients provided by the mobile provided such as iMessage®.

In some embodiments, the various below-described components of FIG. 1 may be used to initiate a plurality of client messaging applications 149-1 . . . -n running on client computing devices 104-1 . . . -n, respectively, provided at least by the mobile communication services server 130. For example, the plurality of messaging applications 149-1 . . . -n, may each comprise a chat interface (e.g., chat interface 148 illustrated in FIG. 2) and may be configured to allow users 150-1 . . . -n, respectively, to communicate by exchanging messages.

The conversation administrator may be activated by initiating a plurality of client conversation administrator applications 127-1 . . . -n which in turn can be initiated after the client messaging applications 149-1 . . . -n have been initiated. For example, the various components of FIG. 1 may be configured to initiate conversation administrator applications 127-1 . . . -n upon receiving user input associated with any of the messaging applications 149-1 . . . -n, as will be described in detail below. In other words, each of the client messaging applications 149-1 . . . -n used by users 150-1 . . . -n to engage in the same conversation will receive the same instance of the conversation administrator application 127-1 . . . -n (i.e., the conversation administrator).

For example, users 150-1 . . . -n may first initiate messaging applications 149-1 . . . -n on client computing devices 104-1 . . . -n, respectively, via one or more user inputs associated with initiating client messaging application 149-1 provided by mobile communication server 130. Users 150-1 . . . -n may utilize messaging applications 149-1 . . . -n to exchange messages with one another. Next, any users participating in the conversation using messaging applications 149-1 . . . -n may provide additional user input configured to initiate conversation administrator application 127-1 . . . -n to join the conversation. In some embodiments, conversation administrator application 127-1 . . . -n may be initiated upon receiving user input associated with initiating the messaging applications 149-1 . . . -n as will be described in detail below. For example, users 150-1 . . . -n may agree that conversation administrator application 127-1 . . . -n may be part of their conversation when using messaging applications 149-1 . . . -n.

In some embodiments and as will be described in detail in FIG. 2, conversation administrator server 102 may include a processor, a memory, and network communication capabilities. In some embodiments, conversation administrator server 102 may be a hardware server. In some implementations, conversation administrator server 102 may be provided in a virtualized environment, e.g., conversation administrator server 102 may be a virtual machine that is executed on a hardware server that may include one or more other virtual machines. Conversation administrator server 102 may be communicatively coupled to a network 103. In some embodiments, conversation administrator server 102 may transmit and receive information to and from client computing devices 104-1 . . . -n, mobile communication services server 130, one or more external services servers 135, and/or other servers via network 103.

Figure 2:
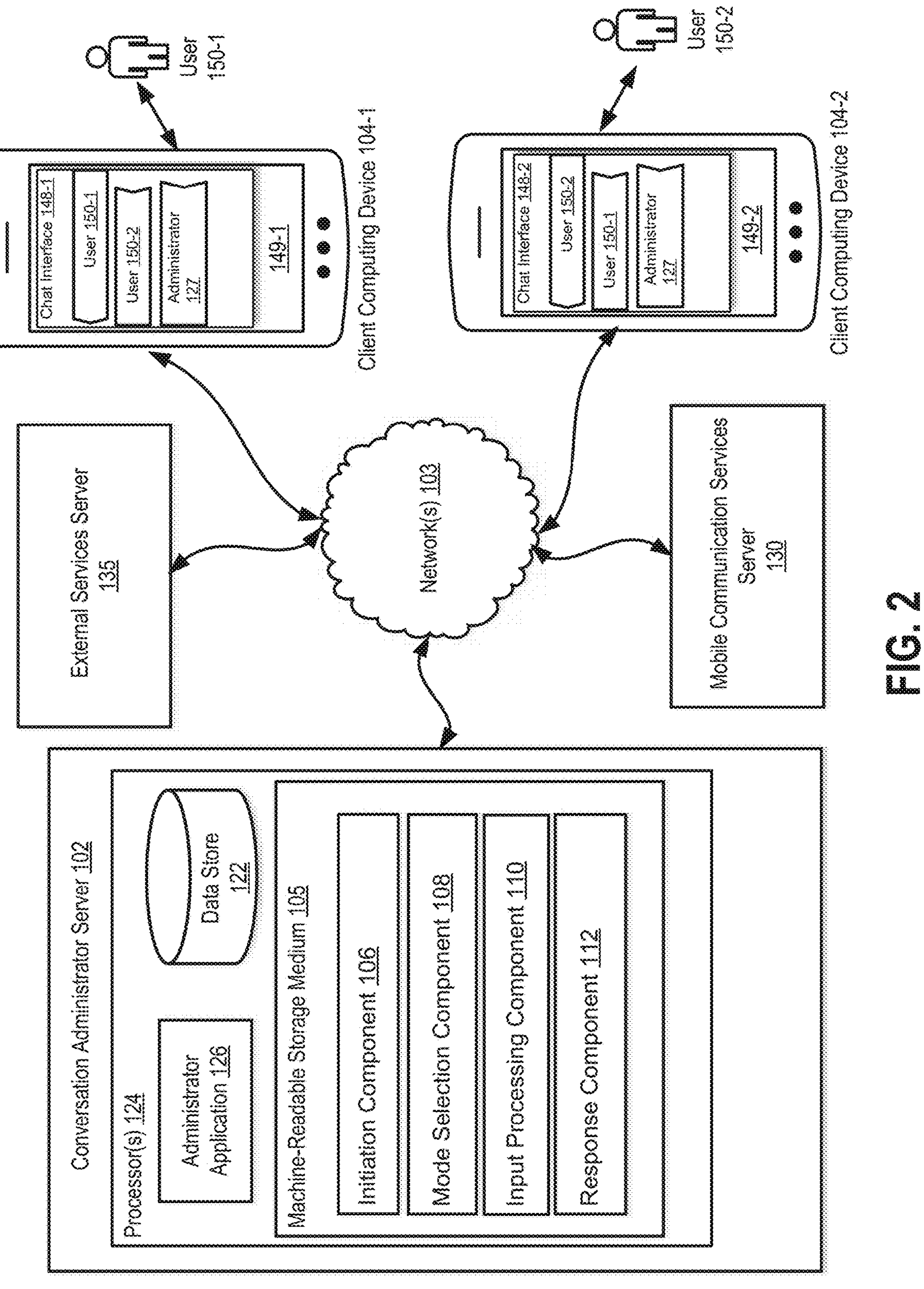
FIG. 2 illustrates an exemplary schematic diagram of a computer-based architecture of an exemplary apparatus of the conversation administrator system of FIG. 1, according to an implementation of the disclosure.

As illustrated in FIG. 2, conversation administrator server 102 may comprise computer program components operable by the processor to enable exchange of messages between users 150-1 . . . -n and conversation administrator provided by conversation administrator applications 127-1 . . . -n.

In some embodiments, virtual assistants are configured to assist users 150-1 . . . -n while engaging in a conversation via client mobile applications 149-1 . . . -n provided on client computing devices 104-1 . . . -n. For example, the conversation administrator may interact with users 150-1 . . . -n through text, e.g., via messaging applications 149-1 . . . -n. In some embodiments, conversation administrator may be implemented by conversation administrator provider (i.e., conversation administer server 102) such that it is not the same as the provider of distributed messaging applications 149-1 . . . -n (i.e., mobile communications services server 130).

In some embodiments, one or more external services servers 135 may be used by conversation administrator server 102 to implement chat assistant services, including human expert services, bot services, and/or other similar services as described in further detail below.

In some embodiments, one or more external services server 135 may include one or more processors, memory and network communication capabilities (not shown). In some embodiments, external services server 135 may be a hardware server connected to network 103, using wired connections, such as Ethernet, coaxial cable, fiber-optic cable, etc., or wireless connections, such as Wi-Fi, Bluetooth, or other wireless technology. In some embodiments, external services server 135 may transmit data between one or more of the conversation administrator server 102 and client computing devices 104-1 . . . -n via network 103. In some embodiments, external services server 135 may be managed by the same party that manages conversation administrator server 102. In other embodiments, external services server 135 may a be third-party server, e.g., controlled by a party different from the party that provides the conversation administrator (i.e., conversation administrator server 102).

In some embodiments, as alluded to above, users 150-1 . . . -n may exchange messages with a conversation administrator assistant 127 within a chat interface of mobile messaging application 149-1 . . . -n provided on client user devices 104-1 . . . -n. For example, users 150-1 . . . -n may enter natural language commands and receive information or conversation administration services.

In some embodiments, client computing devices 104-1 . . . -n may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, client computing devices 104-1 . . . -n may present content to users 150-1 . . . -n and receive user input. In some embodiments, client computing devices 104-1 . . . -n may parse, classify, and otherwise process user input. For example, client computing devices 104-1 . . . -n may store user input including commands for initiating client conversation administrator application 127, as will be described in detail below.

In some embodiments, client computing devices 104-1 . . . -n may be equipped with GPS location tracking and may transmit geolocation information via a wireless link and network 103. In some embodiments, conversation administrator server 102, including conversation administrator applications 127-1 . . . -n, and messaging communication services server 130, including messaging applications 149-1 . . . -n, may use the geolocation information to determine a geographic location associated with users 150-1 . . . -n.

In some embodiments, conversation administrator server 102 and/or messaging communication services server 130 may use signal transmitted by client computing devices 104-1 . . . -n to determine the geolocation of user 150 based on one or more of signal strength, GPS, cell tower triangulation, Wi-Fi location, or other input. In some embodiments, the geolocation associated with users 150-1 . . . -n may be used by one or more computer program components associated with conversation administrator server 102 once the conversation administrator of generated by conversation administrator applications 127-1 . . . -n has been invited by one of users 150-1 . . . -n to join a group chat of messaging applications 149-1 . . . -n interface.

In some embodiments, mobile communication services server 130 may include one or more processors, memory and network communication capabilities. In some embodiments, mobile communication services server 130 may be a hardware server connected to network 103, using wired connections, such as Ethernet, coaxial cable, fiber-optic cable, etc., or wireless connections, such as Wi-Fi, Bluetooth, or other wireless technology. In some embodiments, mobile communication services server 130 may transmit data between one or more of conversation administrator server 102, client computing device 104, and/or other components via network 103.

In some embodiments, mobile communication services server 130 may include one or more distributed mobile applications implemented on client computing devices 104-1 . . . -n as client mobile applications 149-1 . . . -n. In some embodiments, users 150-1 . . . -n may instruct the mobile server 130 to download mobile application on client computing devices 104-1 . . . -n as client mobile applications 149-1 . . . -n. For example, in response to one of users 150-1 . . . -n requesting to download the client mobile applications 149-1 . . . -n, the mobile communication services server 130 may transmit the data to client computing devices 104-1 . . . -n to execute client mobile applications 149-1 . . . -n on client computing devices 104-1 . . . -n.

In some embodiments, client mobile applications 149-1 . . . -n may communicate and interface with a framework implemented by distributed conversation administrator applications 127-1 . . . -n using an application program interface (API) that provides a set of predefined protocols and other tools to enable the communication. For example, the API can be used to communicate particular data from conversation administrator applications 127-1 . . . -n used to connect to and synchronize with client mobile applications 149-1 . . . -n that users 150-1 . . . -n are operating when interacting with client conversation administrator application 127-1 . . . -n during their conversation.

In some embodiments, mobile communication services server 130 may include a data store (not shown). For example, data store may store user data associated with users 150-1 . . . -n, and/or other information. For example, user data may include user account information such as login name, password, preferences, and so on. In some embodiments, user data may include historic information indicating previous interactions between users 150-1 . . . -n and client mobile applications 149-1 . . . -n. For example, historic information may include purchase transaction data or travel reservation data previously made by between users 150-1 . . . -n. In some embodiments, user data including user account data and historic data may be communicated from mobile communication services server 130 to mobile applications 149-1 . . . -n when interacting with client conversation administrator application 127-1 . . . -n during their conversation.

In some embodiments, a standard API can be used between components of conversation administrator server 102, external services server 135, mobile communication server 130 and/or client conversation administrator application 127-1 . . . -n when interacting with client conversation administrator application 127-1 . . . -n during their conversation using client mobile applications 149-1 . . . -n.

FIG. 2 illustrates an example conversation administrator server 102 configured in accordance with one embodiment. Processor(s) 124 may be one or more central processing units (CPUs), semiconductor-based microprocessors, and/or other hardware devices suitable for retrieval and execution of instructions 106-112 stored in machine-readable storage medium 105. Processor(s) 124 may fetch, decode, and execute instructions to control processes or operations for optimizing the system during run-time. As an alternative or in addition to retrieving and executing instructions, processor(s) 124 may include one or more electronic circuits that include electronic components for performing the functionality of one or more instructions, such as a field programmable gate array (FPGA), application specific integrated circuit (ASIC), or other electronic circuits.

A computer readable storage medium, such as machine-readable storage medium 105 may be any electronic, magnetic, optical, or other physical storage device that contains or stores executable instructions. Thus, machine-readable storage medium 105 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 105 may be a non-transitory storage medium, where the term "non-transitory" does not encompass transitory propagating signals. As described in detail below, machine-readable storage medium 105 may be encoded with executable instructions, for example, instructions 106-112, and/or for running various processes and engines described throughout the disclosure.

In some embodiments, as alluded to above, conversation administrator server 102 may include a distributed conversation administrator application 126 and a corresponding client conversation administrator application 127 running on one or more client computing devices 104 (e.g., conversation administrator application 127-1 . . . -n illustrated in FIG. 1).

The corresponding client conversation administrator application 127 may be configured to provide client functionality to enable users 150-1, 150-2 to receive information acquisition and task completion via chat interface 148-1, 148-2 provided on client computing devices 104-1, 104-2, respectively. The chat interface 148-1, 148-2 may be associated with mobile applications 149-1, 149-2, respectively and provided by mobile communication services server 130. For example, users can interact with a conversation administrator application 127 using text commands in a natural language entered into the chat interface in order to receive assistance with various tasks or inquiries that users may request the conversation administrator directly (e.g., asking for a game score, using expert knowledge to generate responses) or inferred by the conversation administrator directly from the conversation (e.g., checking on available flights when friends are discussing an upcoming trip) using various analytics and modeling techniques, resolve disputes between chat participants (e.g., by providing details from earlier in the conversation to help resolve an argument, factual support from a knowledge base, providing emotional guidance and employing other techniques used often by humans), and act in a mediator or counselor capacity (e.g., by using expert techniques in furthering conflict resolution, assisting participants with deciphering emotional cues and tonality, maintaining order and other such similar methods) to all users (i.e., standard or moderator mode) or on an individual basis (i.e., adversarial mode).

In some embodiments, distributed conversation administration application 126 may be operable by one or more processor(s) 124 configured to execute computer readable instructions 105 comprising applications, engines, or modules, including computer program components. In some embodiments, the computer program components may include one or more of an initiation component 106, a mode selection component 108, an input processing component 108, and a response generation component 112, and/or other such components.

In some embodiments, as alluded to above, user 150 may access the conversation administrator server 102 via client computing device 104. In some embodiments, initiation component 106 may be configured to initiate client conversation administrator application 127 on client computing device 104. For example, initiation component 106 may be configured to detect one or more user inputs or interactions from one of the client computing devices 104 and interpret the detected input or interaction as a command for initiating client conversation administrator application 127.

In some embodiments, user 150 may initiate the client conversation administrator application 127 by interacting with an icon corresponding to client conversation administrator application 127 which has been downloaded onto client computing device 104 over network 103. For example, client conversation administrator application 127 may be initiated upon receiving input from user 150 (i.e., the user selects the icon). In other embodiments, user 150 may initiate conversation administrator application 127 via one or more haptic commands, voice commands, and/or a combination of haptic and voice commands. For example, the haptic commands may include user 150 knocking, tapping, and/or scratching on client computing device 104. Alternatively, user 150 may initiate client conversation administrator application 127 by speaking a voice command (e.g., "Hey Angel," "Start Chat Assistant," or "Knock Knock").

In some embodiments, the haptic commands associated with initiating the client conversation administrator application 127 may be selected by the conversation administrator 126 running on the conversation administrator server 102. For example, the conversation administrator 126 may include a double knocking command used to initiate the client conversation administrator application 127. In some embodiments, user 150 may modify the haptic command selection to another command available to the user. For example, user 150 may indicate that instead of double knocking, the user wants to initiate client conversation administrator application 127 by scratching client computing device 104. In some embodiments, user 150 may create a new haptic or voice command by recording the user input associated with the command. In some embodiments, initiation component 106 may be configured to capture audio signal produced from the haptic input (such as knocking, tapping, or scratching) or voice input (such as a command spoken by a user) by the device microphone. For example, user 150 may knock twice on the device resulting in an audio signal. In some embodiments, the captured audio signal may be obtained by initiation component 106 to determine whether the audio signal corresponds to the audio signal used to initiate client conversation administrator application 127. For example, the audio signal may be obtained from a microphone of client computing device 104. In some embodiments, initiation component 106 may be configured to manipulate the audio signal obtained by transmitting the audio signal to the conversation administrator server 102. In some embodiments, initiation component 106 may be configured to process audio signal. For example, initiation component 106 may be configured perform at least one of a noise removal, windowing, and a spectrum analysis during processing of the audio signal. In some embodiments, initiation component 106 may be configured to determine if the audio signal received from the microphone of client computing device 104 is a valid haptic input or a voice command by matching the processed audio signal to a valid audio signal. In some embodiments, the valid audio signal may be obtained from data store 122.

In some embodiments, once initiated, the conversation administrator application 127 may function in a one or more operational modes. For example, active listener, passive listener, supervisor, mediator, and such similar modes. The user initiating the application may select the operation mode at the initiation. In some embodiments, the user may modify the mode during the use of the application.

In some embodiments, user 150 may designate one haptic or voice command to initiate the application 127 in a particular mode. For example, user 150 may assign a double knocking command to be associate with active listener mode.

Figure 3:
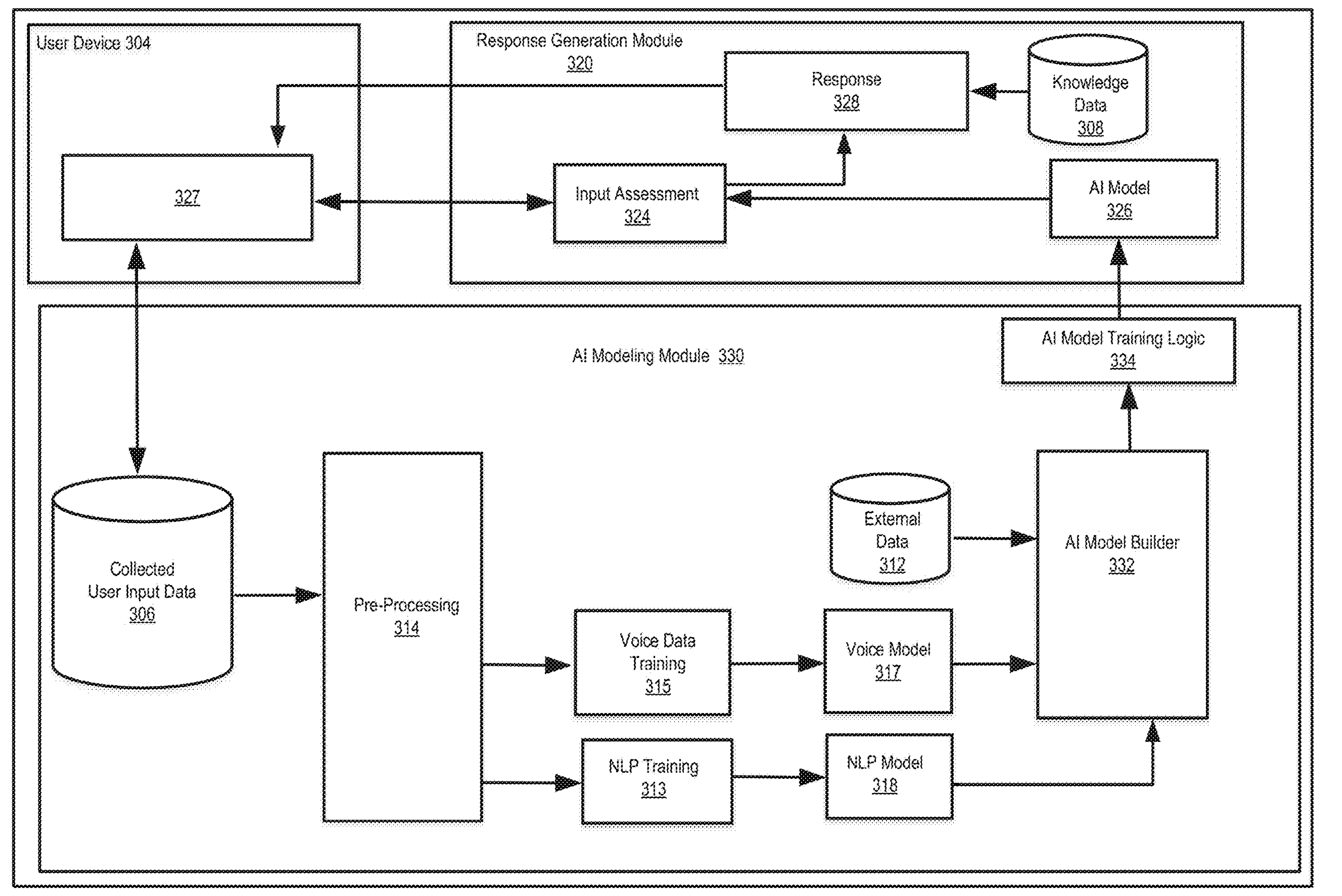
FIG. 3 illustrates a schematic diagram of assistant AI modeling module and response generation module a of the conversation administrator system of FIG. 1 in greater detail, including a general flow of data, according to an implementation of the disclosure.

Having now described an example apparatus for implementing example embodiments, FIG. 3 is a flowchart illustrating example operations of an apparatus 200, according to some example embodiments. The operations of FIG. 3 may be performed by apparatus 102, such as with the conversation administrator system 100 and/or the like.

As shown in FIG. 3, conversation administrator system (system 100 illustrated in FIG. 1) includes an AI modeling module 330, a response generation module 320, and an administrator application 327 (e.g., 127 illustrated in FIG. 1) associated with a user computing device 304 user computing device 340.

AI modeling module 330 is a server computer system that combines a number of machine learning models 332 into a trained model 334 to produce a model 326 using user data collected from previously assisted user interactions from data server and/or database 306. In some embodiments, the AI modeling module 330 receives data from multiple data sources related to analyzing user input and determining the response. This data may include, e.g., previously collected user query data and/or user interaction data (as discussed above), user profile data, including personal preferences, interaction history, contextual information (e.g., location, device usage), user biometric identification (e.g., voice recognition, facial recognition).

In some embodiments, AI modeling module 330 receives chat metadata (e.g., timestamps, participant IDs) and chat content (e.g., messages, attachments) data.

In some embodiments, AI modeling module 330 receives email metadata (e.g., sender, recipient, timestamps) and content (e.g., subject, body, attachments) data.

Accordingly, in some embodiments, the AI modeling module 330 receives the previously collected user input data from a collected user input data 306 and external data from an external information database 312.

Response generation module 320 is a server computer system that includes an AI model 326, an input assessment component 324, and a response component 328. The response generation module 320 receives user input data from the administrator application 327 (e.g., 127 illustrated in FIG. 1) associated with a user computing device 304. The administrator application 327 facilitates retrieval of the data from the user device 304 and its storage with data server 306.

Input assessment component 324 of response generation module 320 applies the model 326 (generated and trained by the AI modeling module 330 described above) and may perform one or more of the following processes. For example, the input assessment component 324 may analyze and interpret user input (e.g., a text message, a voice command, an email communication, a chat message, and so on) utilizing NLP to understand user input content and context, may convert spoken language into text for processing, may classify user input based on subject matter and urgency (e.g., identify keywords and phrases that indicate the urgency of the input), may classify emails based on subject matter and determines the appropriate response category, may extract and analyze any applicable behavior data, e.g., including keystroke rate (e.g., how fast the user is typing), time between keystrokes (e.g., words correlated with user's pausing may be indicative of anxiety), and if the input includes a voice command, analyze the speed, tone, inflection, and similar data associated with the user's voice. Further, the input assessment component 324 may analyzes the emotional tone of the user input to sender's emotional state based on the determined textual input and/or behavior data.

Input assessment component 324 communicates the input assessment to the response component 328, which in turn generates a response based on the input assessment and communicates to the administrator application 327. The response component 328 may construct coherent and contextually appropriate responses in natural language, convert text responses back into spoken language for auditory output, provide automated responses to common queries and gathers initial information before routing to an expert, adapt responses to fit the specific context of the user query, monitor ongoing chats to provide real-time assistance to experts if needed. In some embodiments, the response component 328 may utilize knowledge base 308 when generating a response that requires outside knowledge. In some embodiments, response component 328 may take into account the emotional state of the user and utilize one or more empathetic features configured to improve the emotional state of the user. For example, if the user is agitated, a response configured to lower the agitation may include an acknowledgment of the problem and a resolution.

In some embodiments, the response component 328 may analyze past interactions between users to model user preferences and improve response accuracy and/or matching accuracy when routing the input to an expert (e.g., in the customer service scenario as described herein), and may match input with the most suitable expert based on expertise and availability.

In some embodiments, the user input database 306 may include a corpus of historical user input and interaction data associated with past interactions when assisted by administrator application 327. In some embodiments, the user input database 306 may receive user input data from administrator application 327. User input data ingested from the system 360 may be stored in the user input database 306 for further standardization resulting in generating a reduced set of records for use by the AI modeling module 330.

In some embodiments, the external information database 312 may include a plurality of records related to external data that may be used when analyzing user input, including social media activity data, such as sentiment of social media posts related to a subject of a user input, such as a company or its products (e.g., may assisted how an email is interpreted), trending topics or complaints on platforms like Twitter, Facebook, or LinkedIn (e.g., may help prioritize certain types of customer inquiries that are part of a larger trend), user's engagement with a company's social media accounts (e.g., can offer insights into their loyalty, level of satisfaction, or recent experiences), news articles or media reports mentioning a topic can affect customer sentiment and urgency (e.g., a negative news report might correlate with a spike in urgent or emotionally charged emails), broader industry news can also provide context for user inquiries (e.g., regulatory changes in the industry might lead to an increase in questions or concerns from customers), market data (e.g., stock price fluctuations can influence customer sentiment, especially among investors or stakeholders who might reach out via email), general economic conditions, such as recessions or booms, can impact the tone and urgency of customer communications, purchase or transaction history, website interaction data (e.g., time spent on support pages, items viewed or added to the cart), feedback, survey, and/or review data, geographic data (e.g., regional issues, such as natural disasters or local events, can affect the urgency and emotional tone of customer emails from those areas), time zone data (e.g., time zone differences can influence the perceived urgency of responses, especially for customers in different parts of the world), demographic data, including age, gender, and other demographic details can help personalize responses and prioritize certain user groups, and other such data.

In some embodiments, the external information database 312 may receive reference information from external systems (e.g., external systems 135 illustrated in FIG. 1), such as, e.g., social media platforms, news aggregators weather platforms, among others.

In some embodiments, a knowledge database 308 may include a plurality of records related to particular subject matter that may be accessed by the response component 328 when generating a response. For example, the knowledge base 308 may include relevant articles, FAQs, product information (e.g., detailed product specifications, user manuals, and installation guides, responses to common product-related queries, such as features, compatibility, and usage instructions, troubleshooting guides (e.g., product maps and documentation, step-by-step solutions for common issues customers might encounter, instructions for diagnosing and resolving problems without needing direct CSR intervention), policy and procedure details (e.g., company policies on returns, warranties, shipping, and billing, standard operating procedures for handling specific types of customer inquiries), service updates and announcements (e.g., information about new features, services, or updates, announcements regarding outages, maintenance schedules, or other service-related notices).

As used herein, a "database" refers to any suitable type of database or storage system for storing data. A database may include centralized storage devices, a distributed storage system, a blockchain network, and others, including a database managed by a database management system (DBMS). In some embodiments, an exemplary DBMS-managed database may be specifically programmed as an engine that controls organization, storage, management, or retrieval of data in the respective database. In some embodiments, the exemplary DBMS-managed database may be specifically programmed to provide the ability to query, backup and replicate, enforce rules, provide security, compute, perform change and access logging, or automate optimization. In some embodiments, the exemplary DBMS-managed database may be chosen from Oracle database, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, or objects. In some embodiments, the exemplary DBMS-managed database may be specifically programmed to include metadata about the data that is stored.

AI modeling module 330 receives collected user conversation data 306 that includes the following data, including, e.g., previously collected user query data and/or user interaction data, user profile data, including personal preferences, interaction history, and contextual information, user biometric identification (e.g., voice recognition, facial recognition) and contextual cues (e.g., location, device usage) to identify and differentiate between users, input metadata (e.g., timestamps, participant IDs) and content (e.g., messages, attachments) data, email metadata (e.g., sender, recipient, timestamps) and content (e.g., subject, body, attachments) data. AI modeling module 330 retrieves user input data from the user input database 306 and external information data from the external information database 312.

In some embodiments, user data is processed by the pre-processing component 314 which conditions any user input for optimum analysis, as described in detail below. Ensuring data is complete and devoid of any duplicate records ensures accurate analysis. For example, by utilizing the pre-processing component 314 (shown within AI modeling module 330) improves accuracy with respect to the application of AI model 326. The results of the—processing component 314 may be used by the NLP training component 316 to train language model 318. For example, training component 316 may use natural language processing (NLP) to perform analysis on processed user input. The NLP may be or include any kind of NLP engine, such as a general-purpose NLP engine (e.g., the Natural Language Toolkit (NLTK), spaCy, Stanford NLP, or OpenNLP), a domain-specific (e.g., prescription-specific) NLP engine, Lab NLP, or the Linguamatics), or a Large Language Model (LLM) of any kind(s).

In some embodiments, the pre-processing component 314 may transform the data, such as, e.g., user input (e.g., a text message, an email communication, a chat message, and so on) by parsing into feature vectors or feature maps such that the NLP model component 318 may generate a data category determination. Next, the NLP model 318 may make category predictions based on features of the data. Similarly, pre-processing component 314 conditions any audio data (e.g., from a voice command or voice input) for optimum analysis. Having a high-quality signal to start is very helpful in providing accurate analysis.

Thus, in some embodiments, the pre-processing component 314 may receive the data, parse the data, and extract features according to a feature extraction algorithm. Data parsing and feature extraction may utilize methods depending on a type of data being received. For example, the pre-processing component 314 may include language parsing when the data includes text and character strings. Thus, in some embodiments, the pre-processing component 314 may include text recognition models including, e.g., a classifier for natural language recognition. However, in some embodiments, the data may be a table. In such a case, the pre-processing component 314 may simply extract features into, e.g., a feature vector directly from the data. However, in some embodiments, the data may include a combination of character strings, as well as structured data, such as tables, tuples, lists, arrays, among other. Thus, in some embodiments, the pre-processing component 314 may include model or algorithm for parsing the character strings and then extracting feature vectors from the structured data and the parsed character strings.

In some embodiments, the feature extraction algorithm may include, e.g., independent component analysis, an isomap, kernel principle component analysis (PCA), latent semantic analysis, partial least squares, principal component analysis, multifactor dimensionality reduction, nonlinear dimensionality reduction, multilinear PCA, multilinear subspace learning, semidefinite embedding, autoencoding, among others and combinations thereof. As a result, the pre-processing component 314 may capture the semantic meaning and context of the prescription information (i.e., information which may influence the content category or emotional state) by generating feature vectors having, e.g., text structure or text description, or frequency of certain words, among other possible features. For example, the textual component of the input may be converted into a feature vector using techniques such as Bag-of-Words (BoW), Term Frequency-Inverse Document Frequency (TF-IDF), or word embeddings (e.g., Word2Vec, GloVe).

In some embodiments, the NLP model 318 includes a number of text-based machine learning models to (i) predict emotional states directly from the words spoken by the user and (ii) model factors that correlate with such emotional states. Examples of machine learning that models emotional states directly include sentiment analysis, semantic analysis, language modeling, word/document embeddings and clustering, topic modeling, discourse analysis, syntactic analysis, and dialogue analysis. Models do not need to be constrained to one type of information. A model may contain information for example from both sentiment and topic based features. NLP information includes the score output of specific modules for example the score from a sentiment detector trained for sentiment rather than for emotional state. NLP information includes that obtained via transfer learning based systems.

NLP model 318 stores text metadata and modeling dynamics and shares that data with voice data model 317, and behavior model and analytics 321. Text metadata may include, for example, data identifying, for each word or phrase, parts of speech (syntactic analysis), sentiment analysis, semantic analysis, topic analysis, etc. Modeling dynamics includes data representing components of constituent models of NLP model 318. Such components include machine learning features of NLP model 318 and other components such as long short-term memory (LSTM) units, gated recurrent units (GRUs), hidden Markov model (HMM), and sequence-to-sequence (seq2seq) translation information. NLP metadata allows voice data model 317, and behavior model and analytics 321 to correlate syntactic, sentimental, semantic, and topic information to corresponding portions of the audio signal. Accordingly, voice data model 317, and behavior model and analytics 321 may more accurately model the audio signal.

Voice data model 317, which analyzes the audio portion of the audio signal to find patterns associated with various emotional states, e.g., agitated, annoyed, anxious, angry, calm. Associations between acoustic patterns in speech and emotions are in some cases applicable to different languages without retraining. They may also be retrained on data from that language. A of the particular language spoken. Accordingly, voice data model 317 analyzes the audio signal in a language-agnostic fashion. In this illustrative embodiment, voice data model 317 uses machine learning approaches such as convolutional neural networks (CNN), long short-term memory (LSTM) units, hidden Markov models (HMM), etc. for learning high-level representations and for modeling the temporal dynamics of the audio signals.

Voice data model 317 stores data representing attributes of the audio signal and machine learning features of voice data model 317 as voice data model metadata and shares that data with NLP model 318, and behavior model and analytics 321. The voice data model metadata may include, for example, data representing a spectrogram of the audio signal of the user input. In addition, the voice data model metadata may include both basic features and high-level feature representations of machine learning features. More basic features may include Mel-frequency cepstral coefficients (MFCCs), and various log filter banks, for example, of voice data model 317. High-level feature representations may include, for example, convolutional neural networks (CNNs), autoencoders, variational autoencoders, deep neural networks, and support vector machines of voice data model 317. The voice data model metadata allows NLP model 318 to, for example, use acoustic analysis of the audio signal to improve sentiment analysis of words and phrases.

NLP model 318 stores text metadata and modeling dynamics and shares that data with voice data model 317. Text metadata may include, for example, data identifying, for each word or phrase, parts of speech (syntactic analysis), sentiment analysis, semantic analysis, topic analysis, etc. Modeling dynamics includes data representing components of constituent models of NLP model 318. Such components include machine learning features of NLP model 318 and other components such as long short-term memory (LSTM) units, gated recurrent units (GRUs), hidden Markov model (HMM), and sequence-to-sequence (seq2seq) translation information. NLP metadata allows voice data model 317 to correlate syntactic, sentimental, semantic, and topic information to corresponding portions of the audio signal. Accordingly, voice data model 317 may more accurately model the audio signal.

Voice data model 317 stores data representing attributes of the audio signal and machine learning features of voice data model 317 as voice data model metadata and shares that data with NLP model 318. The voice data model metadata may include, for example, data representing a spectrogram of the audio signal of the user's input.

In addition, the voice data model metadata may include both basic features and high-level feature representations of machine learning features. More basic features may include Mel-frequency cepstral coefficients (MFCCs), and various log filter banks, for example, of voice data model 317. High-level feature representations may include, for example, convolutional neural networks (CNNs), autoencoders, variational autoencoders, deep neural networks, and support vector machines of voice data model 317. The voice data model metadata allows NLP model 318 to, for example, use acoustic analysis of the audio signal to improve sentiment analysis of words and phrases.

NLP training 313 uses the results of pre-processing component 314 to train NLP models 318. For example, NLP model training 313 includes syntactic language model training, semantic pattern model training, speech fluency model training, and non-verbal model training which include logic for training syntactic language model, semantic pattern model, speech fluency model, and non-verbal model, respectively, of NLP training 318.

Voice model training 315 uses the voice data after pre-processing 314 to train voice data mode 317. For example, Voice model training 315 includes pitch/energy model training, quality/phonation model training, speaking flow model training, and articulatory coordination model training, which include logic for training pitch/energy model, quality/phonation pattern model 4104, speaking flow model, respectively, of voice models 317.

AI model builder 332 uses the NLP model 318 and voice model 317 in combination with external data to generate the AI model 326.

In some embodiments, the AI model builder 332 may include, e.g., machine learning models, such as, e.g., one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

The AI model training logic 334 can utilize a machine learning algorithm or other algorithm to construct and train AI model 326 to be used in the input assessment module 324, for example. The model 326 can be constructed to capture, based on the training data, the statistical relationship, if any, between a given feature value and user input s being reviewed by the input assessment module 324. The model 326 may, for example, comprise the statistical correlations between a plurality of content characteristics, context characteristics, behavior characteristics, emotional state characteristics, urgency characteristics, and prescription information of one or more user input. A given feature value may have a different predictive utility for classifying each of the plurality of user inputs to be evaluated in the input assessment procedure.

One or more machine learning algorithms may be used to construct input assessment model, such as support vector machines that deploy stepwise backwards feature selection and/or graphical models, both of which can have advantages of inferring interactions between features. For example, machine learning algorithms or other statistical algorithms may be used, such as alternating decision trees (ADTree), Decision Stumps, functional trees (FT), logistic model trees (LMT), logistic regression, Random Forests, linear classifiers, or any machine learning algorithm or statistical algorithm known in the art. One or more algorithms may be used together to generate an ensemble method, wherein the ensemble method may be optimized using a machine learning ensemble meta-algorithm such as a boosting (e.g., AdaBoost, LPBoost, TotalBoost, BrownBoost, MadaBoost, LogitBoost, etc.) to reduce bias and/or variance. Once the AI model 326 is derived from the training data, the model may be used as a prediction tool to assess user input based on subject matter and urgency (e.g., identify keywords and phrases that indicate the urgency of the input), may classify emails based on subject matter and determines the appropriate response category, may extract and analyze any applicable behavior data, e.g., including keystroke rate (e.g., how fast the user is typing), time between keystrokes (e.g., words correlated with user's pausing may be indicative of anxiety), and if the input includes a voice command, analyze the speed, tone, inflection, and similar data associated with the user's voice. Further, the input assessment component 324 may analyzes the emotional tone of the user input to sender's emotional state based on the determined textual input and/or behavior data. Machine learning analyses may be performed using one or more of many programming languages and platforms known in the art, such as R, Weka, Python, and/or Matlab, for example.

A Random Forest classifier, which generally comprises a plurality of decision trees wherein the output prediction is the mode of the predicted classifications of the individual trees, can be helpful in reducing overfitting to training data. An ensemble of decision trees can be constructed using a random subset of features at each split or decision node. The Gini criterion may be employed to choose the best partition, wherein decision nodes having the lowest calculated Gini impurity index are selected. At prediction time, a "vote" can be taken over all of the decision trees, and the majority vote (or mode of the predicted classifications) can be output as the predicted classification.

Figure 4A:
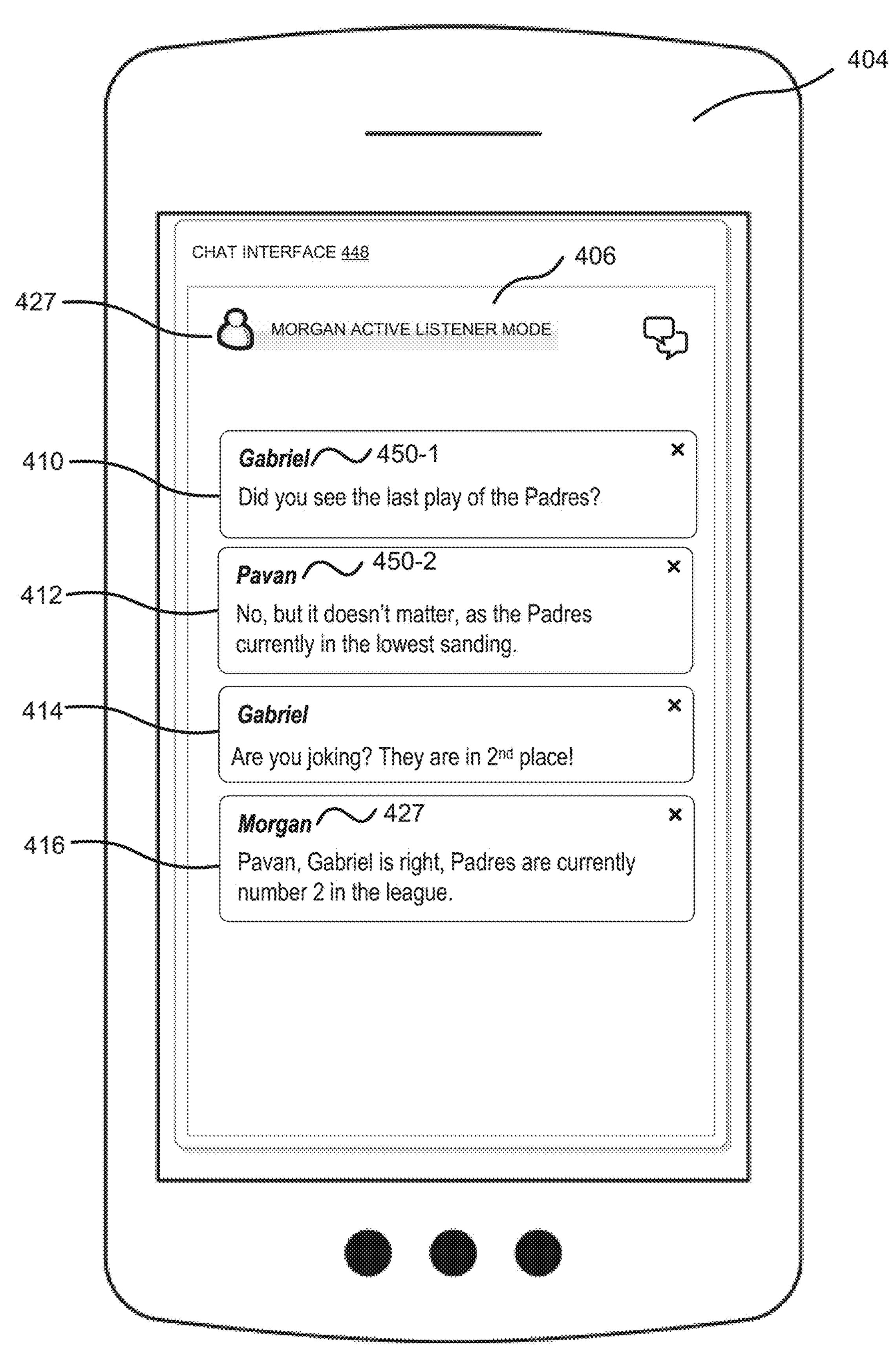
FIG. 4A illustrates an example mobile application used to interact with conversation administrator in an active listener mode, according to an implementation of the disclosure.
Figure 4B:
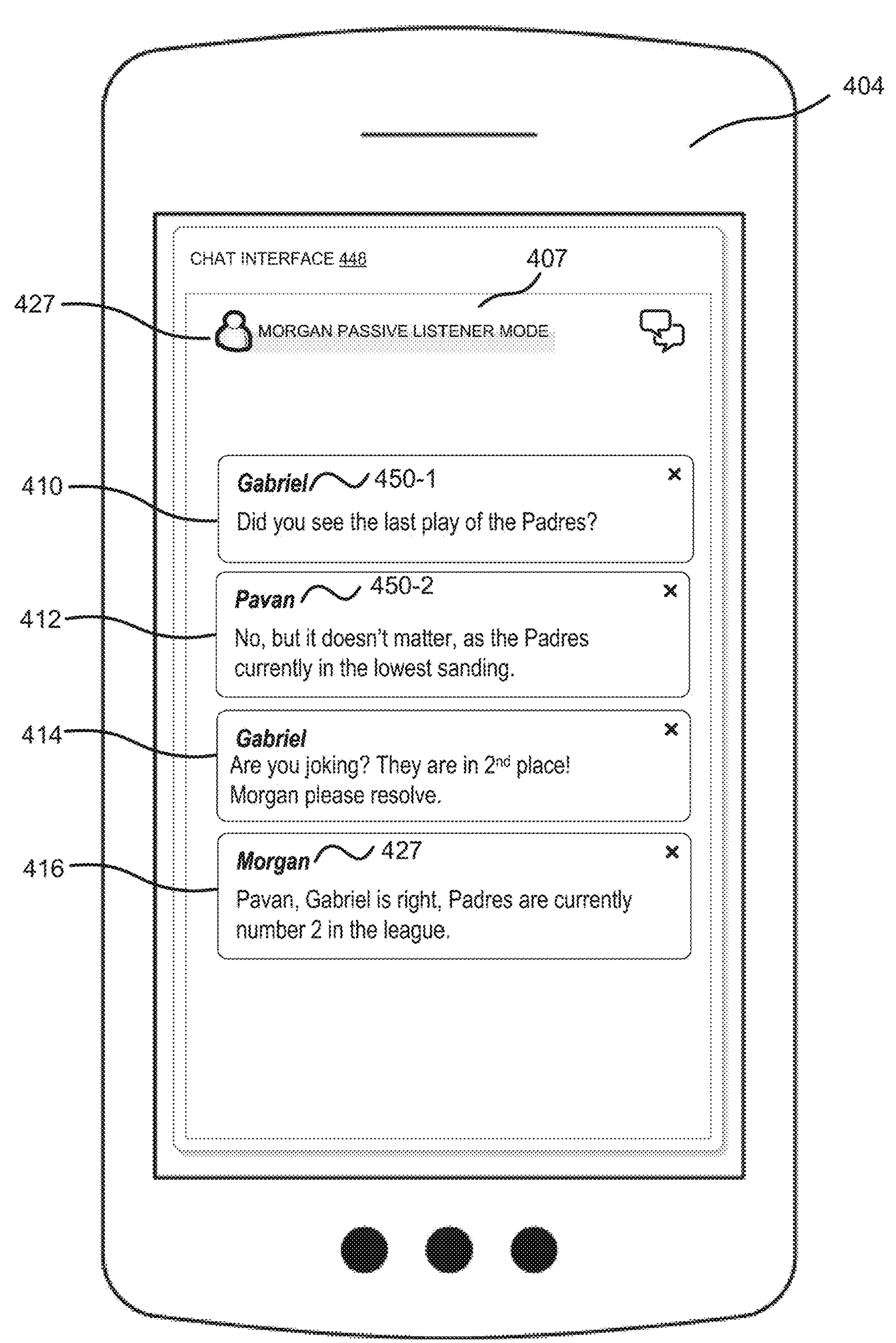
FIG. 4B illustrates an example mobile application used to interact with conversation administrator in a passive listener mode, according to an implementation of the disclosure.

FIGS. 4A-4B illustrate an example interaction between users and a conversation assistant provided by the conversation administrator application (e.g., 127. For example, in FIG. 4A, a chat interface 448 of a chat application is displayed on a client computing device 404 operated by a user. In this example, a chat conversation between users 450-1 and 450-2 and chat assistant 427 has been initiated. In some embodiments, the chat conversation may occur between user 450-1 and conversation assistant 427. In some embodiments, user commands 410 entered by user 450-1 to the chat conversation may be displayed in chat interface 448. For example, user commands from the user 410 can be entered in a text input field of the chat interface 448 (e.g., via input devices such as a physical keyboard, displayed touchscreen keyboard, voice input, etc.).

In some embodiments, the conversation system 100 may be integrated an audio functionality of the mobile device. For example, the conversation administrator may actively listen to a conversation between a user and their counterpart and generate a series of contextually relevant responses including, e.g., statements, questions that the user may utilize in their conversation.

In some embodiments, the conversation system 100 may be integrated with a one or more email applications, including but not limited to Google Gmail, Apple Mail, Microsoft Outlook, among other email programs and services. For example, the user may choose to carbon-copy (CC) an email address (e.g., user@trainangel.com) monitored by the conversation system as a recipient of all incoming and outgoing emails addressed to the user. By analyzing the corpus of user's correspondence, the system learns from the user's email interactions to identify response patterns and priorities. This enables the system 100 to generate and send automated responses tailored to the user's communication style and preferences, thereby improving email efficiency and reducing the user's workload. The system may generate contextually appropriate responses, which can be sent automatically or presented to the user for approval. The system aims to reduce the user's email management burden and enhance productivity.

In some embodiments, the conversation administrator system 100 may provide an automated customer service email solution that reviews incoming emails, analyzes the content, urgency, and emotional sentiment, and determines the best course of action. For example, the system 100 may analyze customer emails and an either generate automated response, provide a draft for review, or route the email to a customer service representative (CSR) based on the determined priority. This system may be configured to enhance efficiency, improve customer satisfaction, and reduce the workload on customer service teams.

Figure 5A:
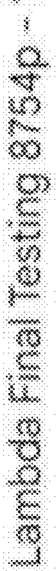
FIGS. 5A-5C illustrate example user interfaces of an conversation administrator system implemented as an email service solution, according to an implementation of the disclosure.
Figure 5A:
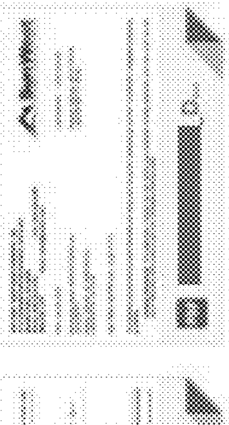
Figure 5A:
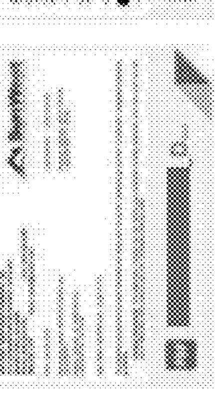
Figure 5A:
Figure 5A:
Figure 5B:
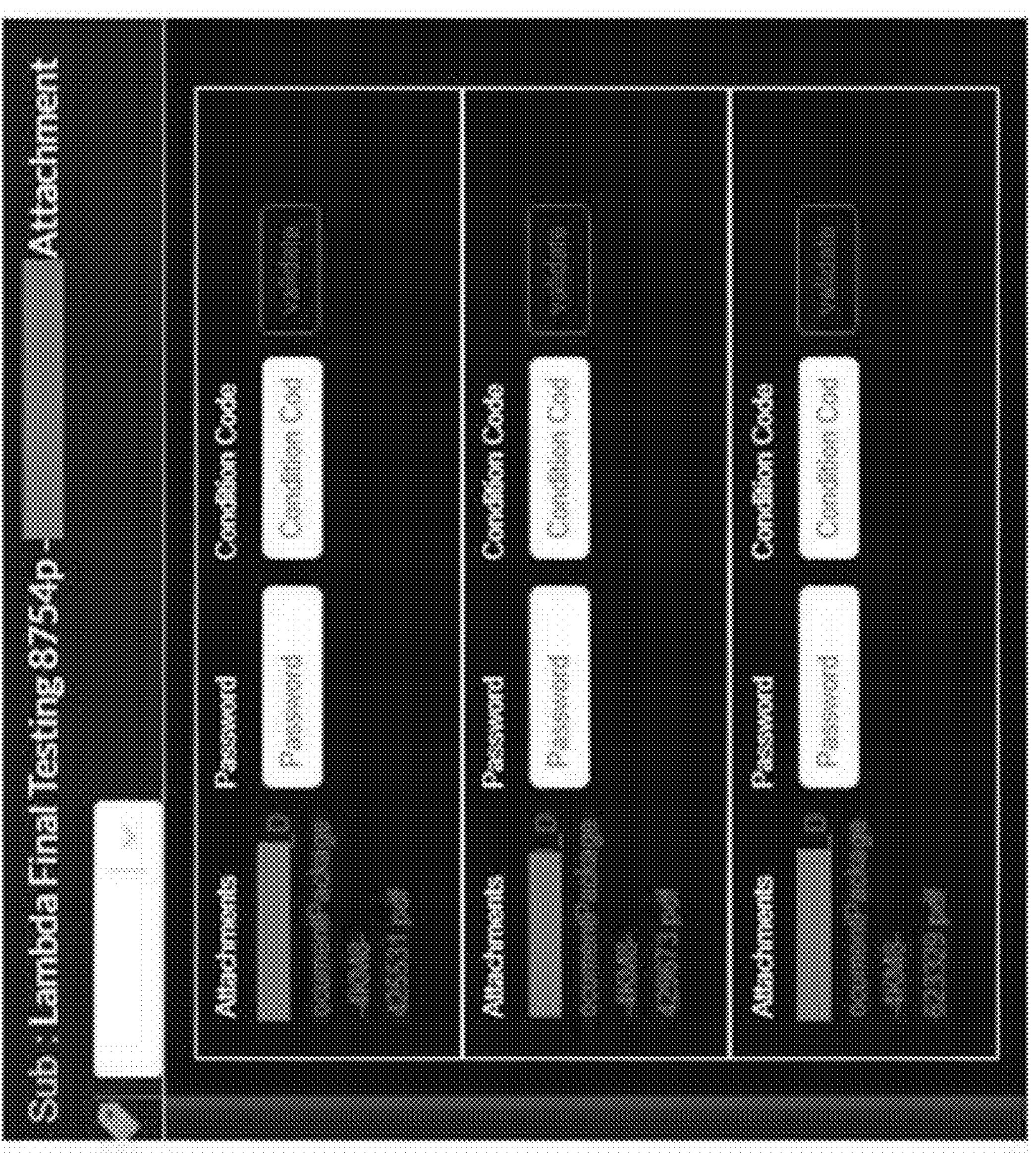

As discussed in reference to FIG. 3, the conversation administrator system 100 implemented as a n email service solution may use an input assessment component (e.g., a component 324 illustrated in FIG. 3) of analyze and interpret an email communication utilizing NLP to understand user input content and context, may classify user input based on subject matter and urgency (e.g., identify keywords and phrases that indicate the urgency of the input), may classify emails based on subject matter and determines the appropriate response category, may extract and analyze any applicable behavior data, e.g., including keystroke rate (e.g., how fast the user is typing), time between keystrokes (e.g., words correlated with user's pausing may be indicative of anxiety), and if the input includes a voice command, analyze the speed, tone, inflection, and similar data associated with the user's voice. Further, the input assessment component may analyzes the emotional tone of the user input to sender's emotional state based on the determined textual input and/or behavior data. In some embodiments, the response component reviews incoming emails, e.g., as illustrated in FIGS. 5A-5B and determines the appropriate response based on the content, urgency, and emotional state of the sender.

Figure 5C:
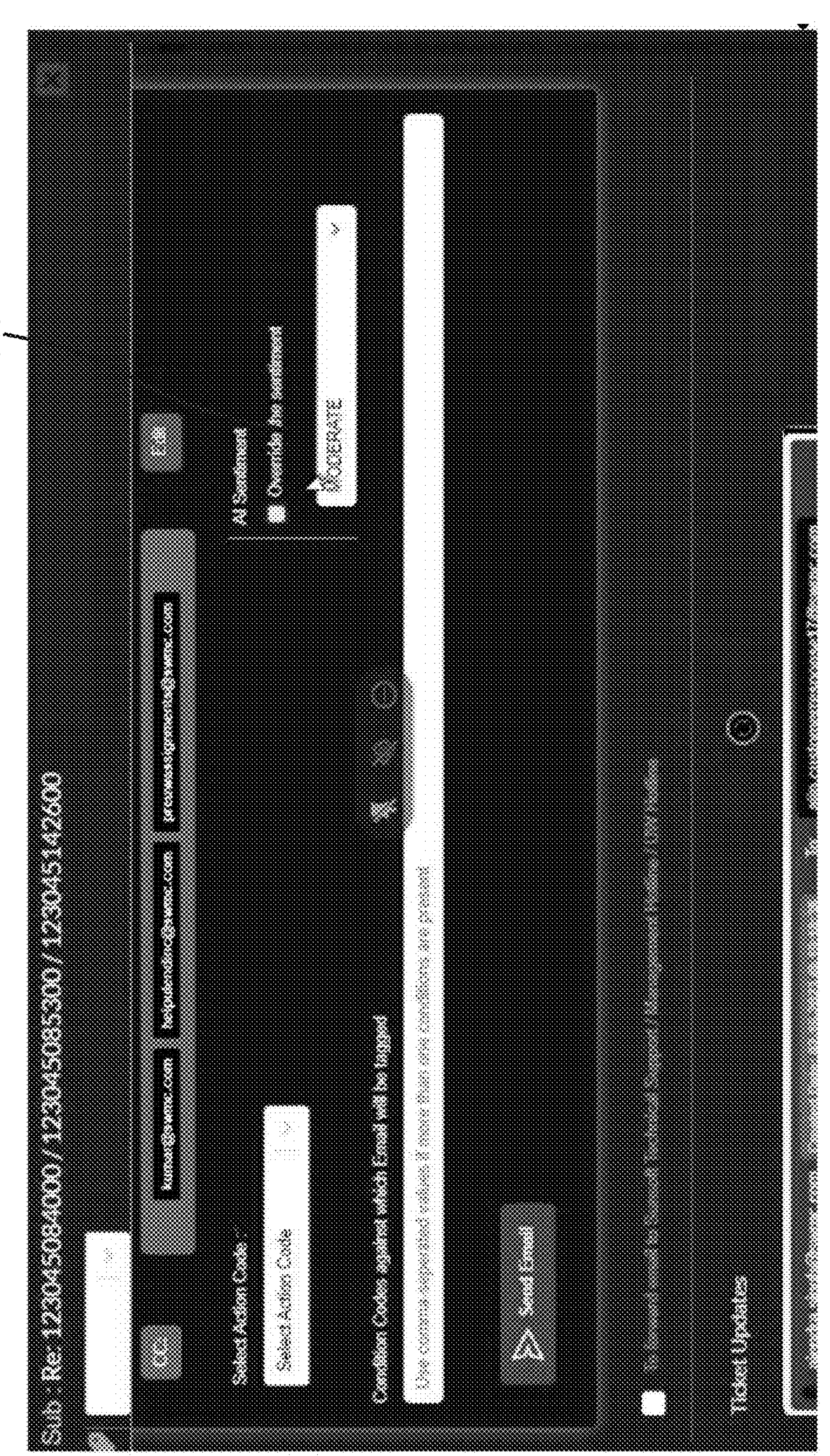

The response component (e.g., a component 328 illustrated in FIG. 3) may receive the input from the input assessment and determine that the emotional tone of the email is exceeding a threshold and may generate a communication to CSR alerting them of a potential emotionally charged email. In some embodiments, the response component may generate a contextually appropriate draft responses in natural language which may take into consideration the level of sentiment. This response may be utilized by the CSR upon review. Alternatively, the sentiment level may be overridden by the CSR. For example, as illustrated in FIG. 5C, a CSR may utilize checkbox 510 to override the determined sentiment. The response component may utilize the override data and use it to train the AI module according to the error resulting from each sentiment level determination. In some embodiments, the response component may generate automated responses directly to clients. For example, upon determining that the emotional tone of the email is not exceeding a threshold, the response component may generate a coherent and contextually appropriate responses in natural language. In yet other embodiments, the response component may provide a response to common queries posed by the client. For example, the response component may first gather relevant data to include in the response. In some embodiments, the response component may utilize a knowledge base (e.g., a knowledge base 308 illustrated in FIG. 3) when generating a response that requires outside knowledge.

Figure 6:
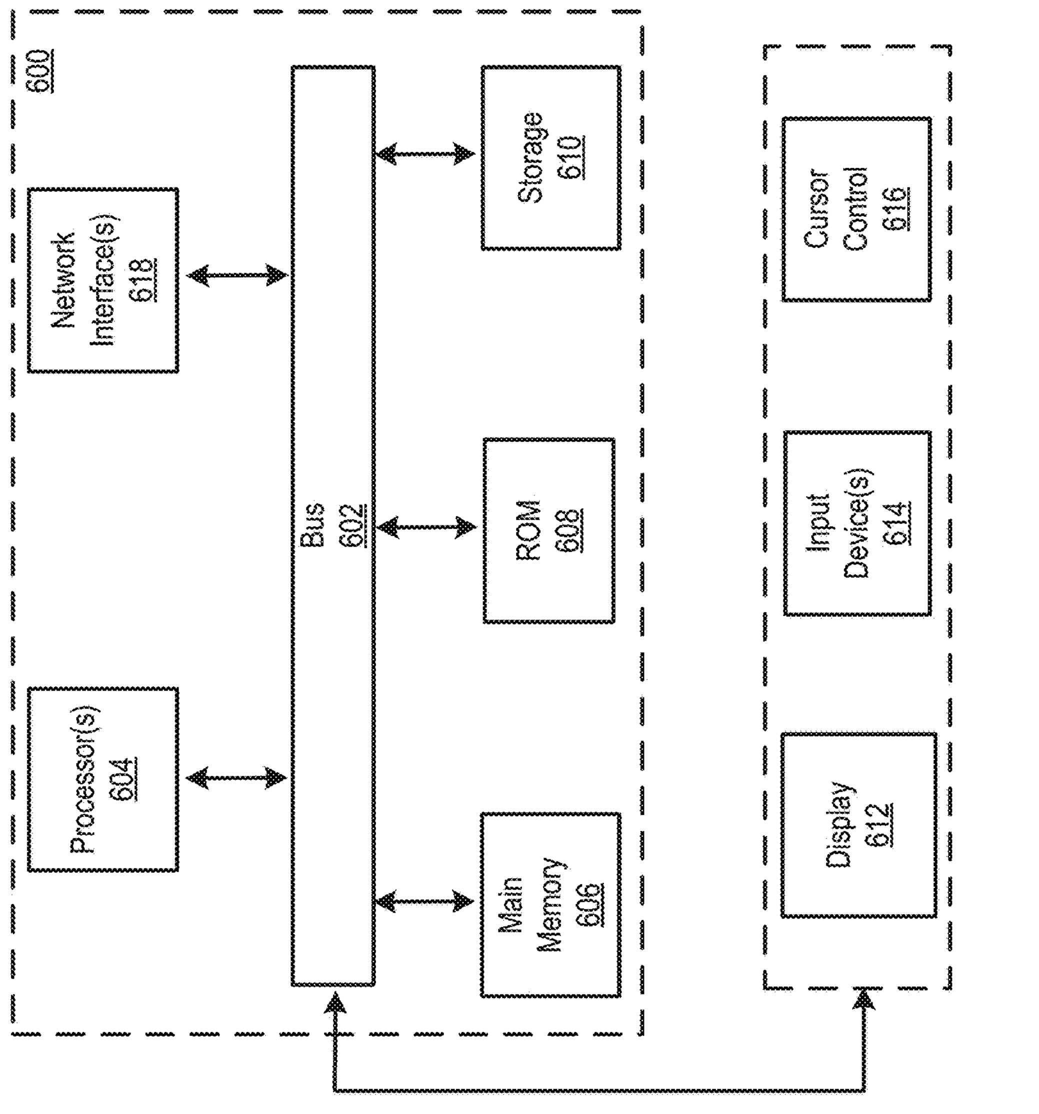
FIG. 6 illustrates an example computing system that may be used in implementing various features of embodiments of the disclosed technology.

FIG. 6 illustrates an example computing module 600, an example of which may be a processor/controller resident on a mobile device, or a processor/controller used to operate a payment transaction device, that may be used to implement various features and/or functionality of the systems and methods disclosed in the present disclosure.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements may be implemented to operate with a computing or processing module capable of carrying out the functionality described with respect thereto. One such example computing module is shown in FIG. 4. Various embodiments are described in terms of this example-computing module 600. After reading this description, it will become apparent to a person skilled in the relevant art how to implement the application using other computing modules or architectures.

Referring now to FIG. 4, computing module 600 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals, and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage devices 610, which might include, for example, a media drive 612 and a storage unit interface 420. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage devices 610 might include other similar instrumentalities for allowing computer programs or other instructions or data to be loaded into computing module 600. Such instrumentalities might include, for example, a fixed or removable storage unit 422 and a storage unit interface 420. Examples of such storage units 422 and storage unit interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 600.

Computing module 600 might also include a communications interface 424. Communications interface 424 might be used to allow software and data to be transferred between computing module 600 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit interface 420, media 614, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for providing assistance to multiple simultaneously using conversational-style inputs, the method comprising:

receiving, by one or more processors, conversational-style inputs exchanged within a group conversation hosted by a messaging application, the group conversation including a plurality of users;

receiving, by the one or more processors, an invitation command to add a conversation administrator account to the group conversation, and, in response, joining the conversation administrator account to the group conversation such that the conversation administrator account is presented as a participant in the group conversation;

maintaining and switching context for multiple user sessions by storing, for each of the plurality of users, a user-specific session context associated with the group conversation, and selecting a user-specific session context based on a user identifier associated with an incoming conversational-style input;

analyzing conversational-style inputs received and assessing an emotional state of each of the plurality of users using a natural language processing module; and generating, based on the assessed emotional state, at least one response for the group conversation, and transmitting the at least one response into the group conversation via the messaging application.

2. The method of claim 1, wherein the conversational-style inputs between multiple users comprise at least one conversational-style input sent by a user.

3. The method of claim 1, wherein the at least one conversational-style input sent by the user comprises text data.

4. The method of claim 1, wherein the natural language processing module comprises one or more deep learning systems applied to the at least one conversational-style input to extract feature representations from the at least one conversational-style input, wherein the feature representations comprise one or more language features.

5. The method of claim 1, wherein the natural language processing module comprises one or more machine learning models to assess emotional state of the user based at least on the feature representations and generate a prediction confidence of the emotional state, wherein the one or more machine learning models comprise at least one of an or a natural language processing model.

6. The method of claim 1, wherein a descriptive feature is incorporated into a machine learning model of the one or more machine learning models, wherein the descriptive feature comprises a direct measurement that characterizes the at least one conversational-style spoken response.

7. The method of claim 6, wherein the direct measurement is a semantic pattern, speech fluency, use of particular words, or speech quality.

8. The method of claim 5, wherein the response to the one conversational-style input sent by the user is generated based on the emotional state of the user.

9. The method of claim 8, wherein the response to the one conversational-style input sent by the user generated based on the emotional state of the user comprises an empathetic feature.

10. A system for providing assistance to multiple users simultaneously using conversational-style inputs, the system comprising:

one or more computing processors; and a non-transitory memory storing instructions;

wherein the instructions, when executed by the one or more processors, implement:

a context management module that maintains and switches context for multiple user sessions by storing, for each of a plurality of users participating in a group conversation, a user-specific session context associated with the group conversation and selecting a user-specific session context based on a user identifier associated with an incoming conversational-style input;

an natural language processing module configured to analyze conversational-style inputs exchanged within the group conversation and assess an emotional state of each user of the plurality of users; and a response module configured to generate, based on output of the natural language processing module, at least one response, and transmit the at least one response into the group conversation via a messaging application.

11. The system of claim 10, wherein the conversational-style inputs between multiple users comprise at least one conversational-style input sent by a user.

12. The system of claim 10, wherein the at least one conversational-style input sent by the user comprises text data.

13. The system of claim 10, wherein the natural language processing module comprises one or more deep learning systems applied to the at least one conversational-style input to extract feature representations from the at least one conversational-style input, wherein the feature representations comprise one or more language features.

14. The system of claim 10, wherein the user NLP natural language processing module comprises one or more machine learning models to assess emotional state of the user based at least on the feature representations and generate a prediction confidence of the emotional state, wherein the one or more machine learning models comprise at least one of an or a natural language processing model.

15. The system of claim 10, wherein a descriptive feature is incorporated into a machine learning model of the one or more machine learning models, wherein the descriptive feature comprises a direct measurement that characterizes the at least one conversational-style spoken response.

16. The system of claim 14, wherein the direct measurement is a semantic pattern, speech fluency, use of particular words, or speech quality.

17. The system of claim 16, wherein the response to the at least one conversational-style input sent by the user is generated based on the emotional state of the user.

18. The system of claim 17, wherein the response to the one conversational-style input sent by the user generated based on the emotional state of the user comprises an empathetic feature.

* * * * *